(12) United States Patent
Uchida

(10) Patent No.: US 6,190,283 B1
(45) Date of Patent: Feb. 20, 2001

(54) DRIVING FORCE CONTROL SYSTEM FOR VEHICLE

(75) Inventor: Masaaki Uchida, Kanagawa (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/458,654

(22) Filed: Dec. 10, 1999

(30) Foreign Application Priority Data

Dec. 16, 1998 (JP) .................................................. 10-357783
Jun. 18, 1999 (JP) .................................................. 11-172426

(51) Int. Cl.$^7$ .................................................. B60K 41/02
(52) U.S. Cl. .................................................. 477/5
(58) Field of Search .................................................. 477/5

(56) References Cited

U.S. PATENT DOCUMENTS

| 4,335,429 | 6/1982 | Kawakatsu | 364/424 |
| 5,904,631 | 5/1999 | Morisawa et al. | 475/5 |
| 5,993,351 | * 11/1999 | Deguchi et al. | 477/5 |
| 6,083,139 | * 7/2000 | Deguchi et al. | 477/5 |

FOREIGN PATENT DOCUMENTS

| 197 17 884 | 2/1998 | (DE) . |
| 0 744 314 | 11/1996 | (EP) . |
| 0 829 387 | 3/1998 | (EP) . |
| 0 856 427 | 8/1998 | (EP) . |
| 62-110536 | 5/1987 | (JP) . |
| 11-341758 | 12/1999 | (JP) . |

* cited by examiner

Primary Examiner—Dirk Wright
(74) Attorney, Agent, or Firm—Foley & Lardner

(57) ABSTRACT

A driving force control system for an automotive vehicle provided with a transmission including a first motor-generator connected to an engine, and a second motor-generator connected to road wheels and driven by electric power generated by the first motor-generator. A first rotational speed sensor is provided for detecting a rotational speed of the first motor-generator. A second rotational speed sensor is provided for detecting a rotational speed of the second motor-generator. A control unit is provided programmed to control the rotational speed of the first motor-generator in accordance with the rotational speed of the second motor-generator. Additionally, the control unit is programmed to control a ratio between a first driving frequency for the first motor-generator and a second driving frequency for the second motor-generator so as to control the rotational speeds of the first and second motor-generators.

18 Claims, 8 Drawing Sheets

DRIVING FORCE CONTROL SYSTEM FOR VEHICLE

BACKGROUND OF THE INVENTION

This invention relates to improvements in a driving force control system for a vehicle provided with a combination of an internal combustion engine and a motor-generator, and more particularly to the driving force control system for the vehicle provided with the engine and a transmission including two motor-generators.

A hybrid vehicle provided with the combination of an engine and a motor-generator has been hitherto known as disclosed in a paper No. 9832288 in a collection of previously printed papers for a science lecture of Society of Automotive Engineers of Japan. The vehicle is arranged to run under drive of at least one of the engine and the motor generator in order to reduce noxious exhaust emission. More specifically, a continuously variable transmission is incorporated with the engine and the motor-generator, so that power outputs of the motor-generator and the engine are controlled in accordance with vehicle operating conditions and a state of a battery.

Additionally, Japanese Patent Provisional Publication No. 62-110536 discloses a vehicle driving control system in which an engine and a continuously variable transmission are combined thereby to control a driving force in such a manner as to generate a target engine torque in accordance with a driver's requirement even during a transition time of speed-changing without using a torque sensor.

SUMMARY OF THE INVENTION

Drawbacks have been encountered in the above conventional techniques, as discussed below. That is, in the former conventional technique disclosed in the paper No. 9832288, when a target engine torque and a target input shaft rotational speed of the continuously variable transmission are set, a control accomplishes a so-called one input and two output manner in which the target engine torque and the target input shaft rotational speed are calculated in accordance with a target output shaft power output determined depending on the vehicle engine operating conditions. This minimizes freedom in setting of the target engine torque and the target input shaft rotational speed. For example, even under different engine operating conditions, the target engine torque and the target input shaft rotational speed always take respectively the same values if the determined target output shaft power output is the same. Consequently, a feeling of physical disorder will be provided to a driver particularly during engine acceleration in which variation in the target input shaft rotational speed or the engine speed is low relative to variation in the vehicle speed.

Additionally, in the former conventional technique in which the continuously variable transmission including planet gears is incorporated with the motor-generator, it is necessary to accomplish an electrical control for the motor-generator and the like and a mechanical control for the transmission. This requires two kinds of control systems thereby complicating the arrangement of a control system while increasing production cost of the vehicle.

In the latter conventional technique disclosed in Japanese Patent Provisional Publication No. 62-110536, a control system is configured such that the target input shaft rotational speed is determined in accordance with a target driving torque and a vehicle speed, in which a target power output is not calculated though an engine speed can be set in accordance with the vehicle speed. Accordingly, for example, it cannot correct the loss of a motor-generator nor realize power generation in accordance with the charged state of the battery. This makes it impossible to incorporate the motor-generator with the control system.

It is an object of the present invention to provide an improved driving force control system for a vehicle, which can effectively overcome drawbacks encountered in conventional similar driving force control systems.

Another object of the present invention is to provide an improved driving force control system for a vehicle equipped with a combination of an engine and a motor-generator, which makes it possible to change an engine speed in accordance with a vehicle speed, thereby precisely carrying out a speed-changing control for the vehicle.

A further object of the present invention is to provide an improved driving force control system for an automotive vehicle equipped with a combination of an engine and a continuously variable transmission including two motor-generators, which makes it possible to change an engine speed in accordance with a vehicle speed, thereby precisely carrying out a speed-changing control for the vehicle.

A first aspect of the present invention resides in a driving force control system for a vehicle, comprising a transmission including a first motor-generator connected to an engine, and a second motor-generator connected to driven wheels and driven by electric power generated by the first motor-generator. A first rotational speed sensor is provided for detecting a rotational speed of the first motor-generator. A second rotational speed sensor is provided for detecting a rotational speed of the second motor-generator. A control unit is provided programmed to control the rotational speed of the first motor-generator in accordance with the rotational speed of the second motor-generator. Additionally, the control unit is programmed to control a ratio between a first driving frequency for the first motor-generator and a second driving frequency for the second motor-generator so as to control the rotational speeds of the first and second motor-generators.

A second aspect of the present invention resides in a driving force control system for a vehicle, comprising a transmission including a first motor-generator connected to an engine, and a second motor-generator connected to driven wheels. Additionally, a control unit is provided programmed to carry out (a) calculating a first target driving torque in accordance with at least one of an operating condition of the vehicle and a driver's operation for the vehicle, (b) calculating a target power output in accordance with the first target driving torque and a value representative of a vehicle speed, (c) correcting the target power output in accordance with an operating condition of the transmission, (d) setting a second target driving torque upon calculating the second target driving torque in accordance with the corrected target power output and the value representative of the vehicle speed, (e) setting a target input shaft rotational speed of the transmission upon calculating the target input shaft rotational speed in accordance with the second target driving torque and the value representative of the vehicle speed, (f) setting a target engine torque upon calculating the target engine torque in accordance with a speed-changing ratio set for the transmission and the second target driving torque, the target engine torque, and (g) controlling the first motor-generator in accordance with the target input shaft rotational speed, and (h) controlling the second motor-generator in accordance with the first target driving torque.

A third aspect of the present invention resides in a method of controlling driving force for a vehicle provided with a transmission including a first motor-generator connected to an engine, and a second motor-generator connected to driven wheels and driven by electric power generated by the first motor-generator, a first rotational speed sensor for detecting a rotational speed of the first motor-generator, and a second rotational speed sensor for detecting a rotational speed of the second motor-generator. The driving force controlling method comprises (a) controlling the rotational speed of the first motor-generator in accordance with the rotational speed of the second motor-generator; and (b) controlling a ratio between a first driving frequency for the first motor-generator and a second driving frequency for the second motor-generator so as to control the rotational speeds of the first and second motor-generators.

A fourth aspect of the present invention resides in a method of controlling driving force for a vehicle provided with a transmission including a first motor-generator connected to an engine, and a second motor-generator connected to driven wheels. The driving force controlling method comprises (a) calculating a first target driving torque in accordance with at least one of an operating condition of the vehicle and a driver's operation for the vehicle; (b) calculating a target power output in accordance with the first target driving torque and a value representative of a vehicle speed; (c) correcting the target power output in accordance with an operating condition of the transmission; (d) setting a second target driving torque upon calculating the second target driving torque in accordance with the corrected target power output and the value representative of the vehicle speed; (e) setting a target input shaft rotational speed of the transmission upon calculating the target input shaft rotational speed in accordance with the second target driving torque and the value representative of the vehicle speed; (f) setting a target engine torque upon calculating the target engine torque in accordance with a speed-changing ratio set for the transmission and the second target driving torque; (g) controlling the engine in accordance with the target engine torque; and (h) controlling the first motor-generator in accordance with the target input shaft rotational speed, and controlling the second motor-generator in accordance with the first target driving torque.

BRIEF DESCRIPTION OF THE DRAWINGS

In the drawings, like reference numerals and characters designate like parts and elements throughout all the figures, in which.

DETAILED DESCRIPTION OF THE INVENTION

Figure 1:
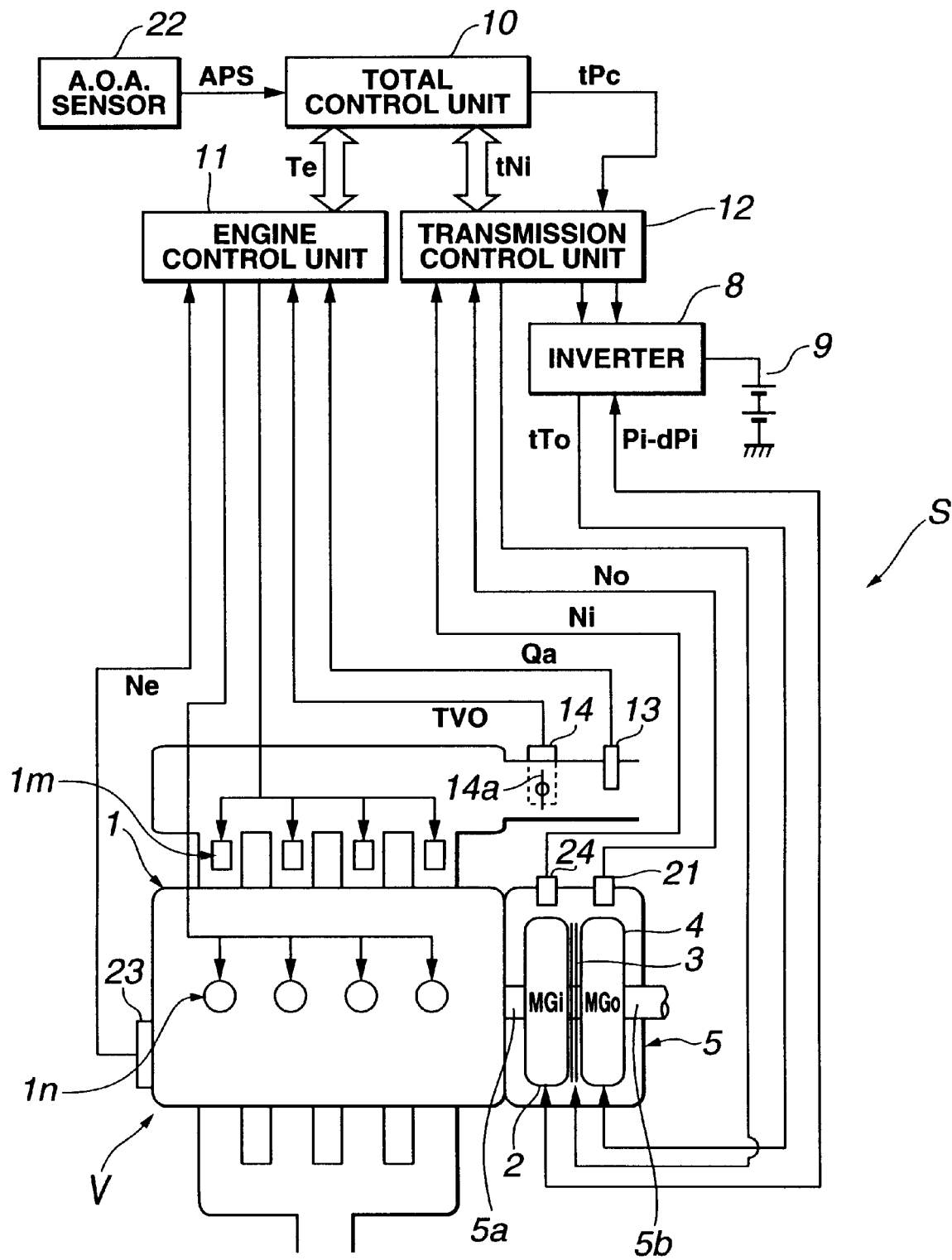
FIG. 1 is a diagrammatic illustration of a first embodiment of a driving force control system for a vehicle, according to the present invention.

Referring now to FIG. 1, a first embodiment of a driving force control system for a vehicle V is illustrated by the reference character S. The vehicle V in this instance is an automotive vehicle and provided with an internal combustion engine 1 to which a continuously variable transmission 5 is operatively connected. The transmission 5 includes an input-side or first motor-generator (MGi) 2, and an output-side or second motor-generator (MGo) 4. The input-side motor-generator 2 is connected through an input shaft 5a of the transmission 5 to the engine 1. The output-side motor-generator 4 is connected through an output shaft 5b of the transmission 5 to a drive shaft (not shown) of the vehicle V. The drive shaft is connected to driven or road wheels (not shown) of the vehicle V. Each of the first and second motor-generators 2, 4 is a a.c. (alternating-current) machine or motor (for example, a permanent-magnet type a.c. synchronous motor). Each of the first and second motor-generators 2, 4 is connected to an inverter 8. The first motor-generator 2 basically serves as a generator, while the second motor-generator 2 basically serves as an electric motor and driven by electric power from the first motor-generator 2.

The engine 1 is provided with an electronically controlled throttle device 14 having a throttle valve 14a. A valve opening degree TVO of the throttle valve 14a is controlled in accordance with a driver's depression amount APS of an accelerator pedal (not shown) under the action of an engine control unit 11 which will be discussed after. The accelerator pedal depression amount APS is detected by an accelerator operational amount sensor 22. Thus, the throttle device 14 can provide an engine torque Te in accordance with vehicle operating conditions. The engine control unit 11 for controlling the engine 1 determines the throttle valve opening degree TVO of the electronically controlled throttle device 14 by using a previously set map or the like, in accordance with the accelerator pedal depression amount APS. Additionally, the engine control unit 11 accomplishes a fuel injection control and a spark timing control in accordance with an intake air quantity Qa detected by an air-flow meter 13 and an engine speed Ne detected by a crankangle sensor 23. The fuel injection is made on a fuel injection system 1m including fuel injector valves (not shown). The spark timing control is made on an ignition system 1n including spark plugs (not shown).

A transmission control unit 12 is provided to control the continuously variable transmission 5 and arranged to supply first and second driving frequencies respectively to the first and second motor-generators 2, 4, in which the rotational speeds of first and second motor-generators 2, 4 are controlled respectively in accordance with the driving frequencies from the inverter 8. A ratio (driving frequency ratio) between the first and second driving frequencies corresponds to a ratio in rotational speed between input and output shafts 5a, 5b and therefore corresponds to a speed-changing ratio of the transmission 5. The speed-changing ratio in this instance is a ratio between a rotational speed Ni of the first motor-generator 2 (or the input shaft 5a) and the rotational speed of the second motor-generator 4 (or the output shaft 5b).

A clutch 3 is operatively interposed between the first and second motor-generators 2, 4 and adapted to be selectively engageable to couple the first and second motor-generators 2, 4. When the clutch 3 is engaged, the engine 1 is directly connected through the transmission 5 to the drive shaft of the vehicle V, so that the drive shaft is driven in accordance with a power output of the engine 1. For example, when the rotational speed Ni of the input shaft 5a of the transmission 5 is equal to the rotational speed No of the output shaft 5b of the transmission 5, the clutch 3 is engaged so that a torque due to the driving force of the engine 1 is directly transmitted to the drive shaft and to drive or road wheels, thereby suppressing a transmission loss by the motor-generators 2, 4 thus improving a fuel consumption of the vehicle V.

Here, the transmission 5 is provided with an input shaft rotational speed sensor 24 and an output shaft rotational speed sensor 21. The input shaft rotational speed sensor 24 is adapted to detect a rotational speed of a rotor (not shown) of the first motor-generator 2 connected to the engine 1, as the input shaft rotational speed Ni. The output shaft rotational speed sensor 21 is adapted to detect a rotational speed of a rotor (not shown) of the second motor-generator 4 connected to the drive shaft of the vehicle V, as the output shaft rotational speed No. The transmission control unit 12 reads the detected values of these rotational speeds Ni, No. It will be understood that the input shaft rotational speed Ni is equal to an engine speed Ne of the engine 1 since the input shaft of the transmission 5 is directly connected to the engine 1.

The transmission control unit 12 is adapted to control the first and second driving frequencies of the inverter 8 in such a manner as to realize a target input shaft rotational speed tNi and a target output shaft torque tTo which are calculated by a total control unit 10, as discussed below. The total control unit 10 is adapted to read the output shaft rotational speed No of the transmission detected by the output shaft rotational speed sensor 21, the input shaft rotational speed Ni of the transmission detected by the input shaft rotational speed sensor 24, and the accelerator pedal depression amount APS detected by the accelerator operational amount sensor 22, and then calculate the target output shaft torque tTo and the target input shaft rotational speed tNi in accordance with the informations No, Ni, APS representative of the vehicle operating condition, as discussed below. Additionally, the total control unit 10 calculates a vehicle speed VSP of the vehicle V by multiplying the output shaft rotational speed No by certain constants corresponding to a speed-reduction ratio of a differential (or final reduction gear) and/or the like, a radius of the drive or road wheel, and the like.

Additionally, the total control unit 10 is adapted to send information of a target charging amount tPc to the transmission control unit 12 so as to cause a part of electric power generated by the first motor-generator 2 to be supplied to a battery 9 in case that a charged amount of the battery 9 is lowered. The charged amount means an electrical energy stored in the battery. The charged amount of the battery 9 is detected by a sensor (not shown).

An example of the driving power control carried out by the total control unit 10 will be discussed with reference to FIG. 2.

First, an engine torque estimating section 51 forming part of the total control unit 10 calculates a torque Te generated by the engine 1 as an input shaft torque Ti, from a previously set map map 1 and in accordance with the throttle opening degree TVO of the electronically controlled throttle device 14 depending on the depression amount APS of the accelerator pedal and with the input shaft rotational speed Ni which is the rotational speed of the first motor-generator 2 of the continuously variable transmission 5.

Subsequently, an input shaft power output calculating section 52 forming part of the total control unit 10 calculates an input shaft power output Pi by multiplying the detected input shaft rotational speed Ni by the input shaft torque Ti. The input shaft power output Pi is a power output for driving the first motor-generator 2 and therefore equivalent to an engine power output Pe.

An input-side loss calculating section 57 forming part of the total control unit 10 calculates a loss power dPi of the first motor-generator 2 in accordance with the input shaft torque Ti and the input shaft rotational speed Ni by using a previously set map map2. The map map2 has been previously set, for example, in accordance with an efficiency of the first motor-generator 2. A first target power output calculating section 53 forming part of the total control unit 10 calculates a first target output shaft power output tPo1 by subtracting the loss power dPi from the input shaft power output Pi.

An output-side loss calculating section 58 forming part of the total control unit 10 calculates a loss power dPo of the second motor-generator 4 in accordance with a prior time value $tTo*z^{-1}$ of the target output shaft torque tTo and a current value of the output shaft rotational speed No by using a previously set map map3. The prior time value means the value at a prior time, such as the immediately preceding computer computation cycle, while the present time value means the value at the present time, such as the present computer computation cycle. A second target output shaft power output calculating section 54 forming part of the total control unit 10 calculates a second target output shaft power output tPo2 by subtracting the loss power output dPo from the first target output shaft power output tPo1. Then, a third target output shaft power output calculating section 55 forming part of the total control unit 10 calculates a third target output shaft power output tPo3 by subtracting the target charging amount tPc depending on the charged amount of the battery 9, from the second target output shaft power output tPo2.

Subsequently, a target output shaft torque calculating section 56 forming part of the total control unit 10 calculates a target output shaft torque tTo of the second motor-generator 4 at the output-side of the continuously variable transmission 5.

A target input shaft rotational speed calculating section 59 forming part of the total control unit 10 calculates a target input shaft rotational speed tNi of the first motor-generator 2 at the input-side of the continuously variable transmission 5 in accordance with the output shaft rotational speed No (or the vehicle speed VSP) and the accelerator pedal depression amount APS by using a previously set map map4.

Figure 3:
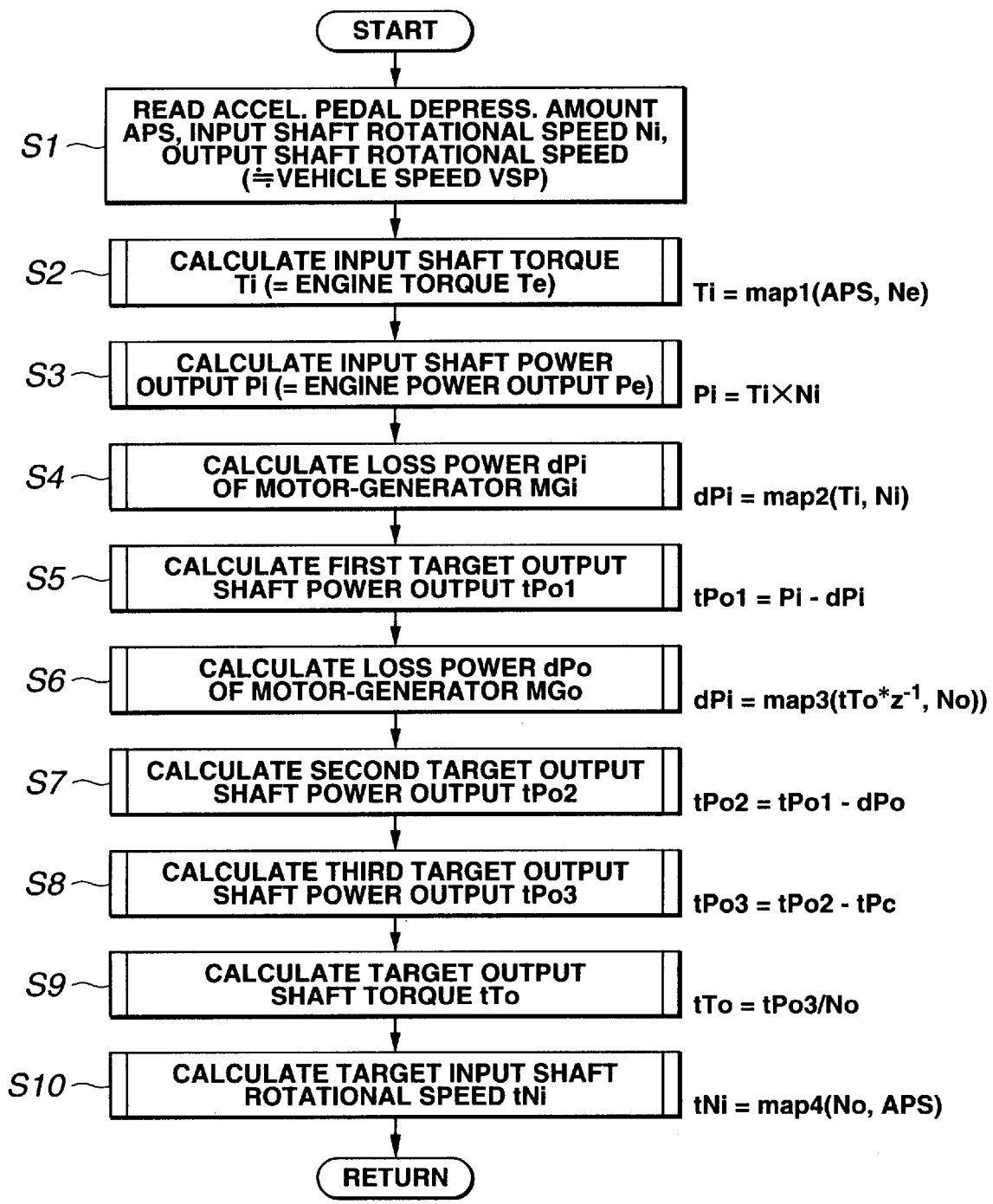
FIG. 3 is a flowchart of an example of a driving force control by the driving force control system of FIG. 1.

Here, the above example of the driving force control carried out by the total control unit 10 will be further discussed with reference to a flowchart shown in FIG. 3. A routine of the flowchart is executed every a certain time, for example, 10 msec.

First, at a step S1, the information such as the accelerator pedal depression amount APS (≈the throttle opening degree TVO), the input shaft rotational speed Ni, the output shaft rotational speed No ( the vehicle speed VSP), and the like are read from the various sensors shown in FIG. 1. At a step S2, the input shaft torque Ti (=the engine torque Te) of the continuously variable transmission 5 is calculated from the map map 1 shown in FIG. 2.

At a step S3, the input shaft power output Pi is calculated by multiplying this input shaft torque Ti by the input shaft rotational speed Ni.

Figure 2:
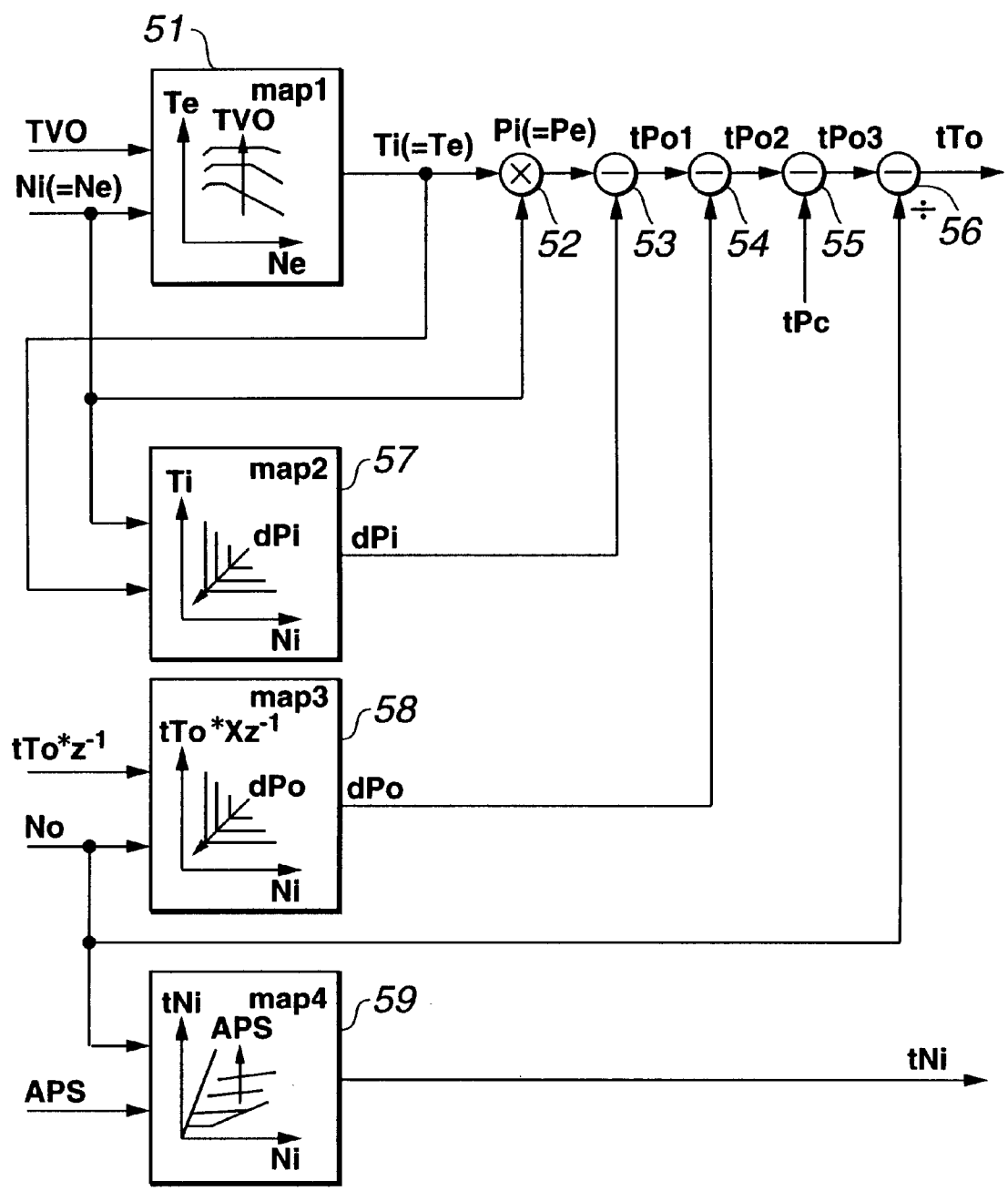
FIG. 2 is a diagram of principle of a control in a total control unit forming part of the driving force control system of FIG. 1.

At a step S4, the loss power dPi of the first motor-generator 2 is calculated in accordance with the input shaft torque Ti and the input shaft rotational speed Ni by using the map map2 shown in FIG. 2.

At a step S5, the first target output shaft power output tPo1 is calculated by subtracting the loss power dPi from the input shaft power output Pi determined at the above step S3.

At a step S6, the loss power dPo is calculated in accordance with the prior time value tTo*z$^{-1}$ of the target output shaft torque and the output shaft rotational speed No by using the map map3 shown in FIG. 2.

At a step S7, the second target output shaft power output tPo2 is calculated by subtracting the loss power output dPo from the first target output shaft power output tPo1 determined at the above step S5.

Subsequently, at a step S8, the third target output shaft power output tPo3 is calculated by subtracting the target charging amount tPc according to a charging requirement of the battery 9, from the second target output shaft power output tPo2. It will be understand that the charging requirement depends on the charged amount of the battery 9.

At a step S9, the target output shaft torque tTo is calculated by dividing the third target output shaft power output tPo3 by the output shaft rotational speed No.

At a step S10, the target input shaft rotational speed tNi is calculated in accordance with the output shaft rotational speed No (the vehicle speed VSP) and the accelerator pedal depression amount APS by using the map map4 shown in FIG. 2.

As discussed above, the total control unit 10 calculates the target output shaft torque tTo of the second motor-generator 4 at the output-side of the continuously variable transmission 5, and the target input shaft rotational seed tNi of the first motor-generator 2 at the input-side of the continuously variable transmission 5. These target values are sent as commands to the transmission control unit 12. At this time, the transmission control unit 12 makes such a feedback control as to cause the input shaft rotational speed Ni of the first motor-generator 2 at the input-side of the continuously variable transmission 5 to become coincident with the target input shaft rotational speed tNi from the total control unit 10, through the driving frequencies of the inverter 8, thereby controlling the speed-changing ratio of the continuously variable transmission 5. Additionally, the transmission control unit 12 controls a driving torque To of the second motor-generator 4 at the output-side of the continuously variable transmission to become coincident with the target output shaft torque tTo which is obtained by subtracting a loss amount (power) and a charged amount (electric energy) from the power generated by the first motor-generator 2.

In case that the above-mentioned permanent-magnet type a.c. synchronous motor is used as each of the motor-generators 2, 4, control of the rotational speed becomes equivalent to control of the driving frequency, so that the torque of the motor-generators 2, 4 is regulated to increase or decrease in such a manner that the rotational speed of the rotor becomes coincident with the target rotational speed.

Here, on the assumption that the speed-changing ratio =input shaft rotational speed Ni/the output shaft rotational speed No, the target speed-changing ratio is represented by the target input shaft rotational speed tNi/the output shaft rotational speed No. Accordingly, the target speed-changing ratio is determined in accordance with the accelerator pedal depression amount APS as at the above-mentioned step S10, so that the rotational speed or the driving frequency of the first motor-generator 2 is controlled in a feedback manner.

The target output shaft torque tTo of the second motor-generator 4 at the output-side of the continuously variable transmission 5 is represented by the following equation, in connection with the above steps S2 to S9:

tTo=(Ti×Ni−dPi−dPo−tPc)/No

This equation is modified as follows:

tTo=Ti×(Ni/No)−(dPi+dPo+tPc)/No

Accordingly, the second motor-generator 4 is driven to realize the target output shaft torque tTo which is obtained by subtracting (for the purpose of correction) the loss amount and the like of the second motor-generator 4 from a value which is obtained by multiplying the engine torque Te (the input shaft torque Ti) by the speed-changing ratio (=Ni/No).

Thus, even though the continuously variable transmission is constituted of a pair of the motor-generators 2, 4, the relationship of the driving torque To≈the engine torque Te×the speed-changing ratio is established. Accordingly, it is made possible to control the speed-changing ratio in accordance with the driving frequency ratio. Additionally, it is made possible to accomplish a correction for a loss of the motor-generator and to realize a power generation in accordance with a charged state (or the charged amount) of the battery.

According to the above embodiment, in the vehicle equipped with the transmission including the first motor-generator connected to the engine and the second motor-generator connected to the driven wheels and driven by the electric power generated by the first motor-generator, the rotational speed (or the input shaft rotational speed) of the first motor-generator is controlled in accordance with the rotational speed (or the value corresponding to the vehicle speed) of the second motor-generator at the side of the driven wheel, thus making it possible to control the speed-changing ratio of the transmission. This speed-changing ratio control is realized by regulating the driving frequencies for the respective motor generators. As a result, a speed-changing control can be precisely carried out in case of using the transmission including a pair of motor-generators.

While the engine 1 has been shown and described as being provided with the electronically controlled throttle device 14, it will be understood that the throttle device 14 may be replaced with a throttle device in which the throttle opening degree TVO is directly controlled by the accelerator pedal, in which a parameter (the accelerator pedal depression amount APS) of the map map4 in FIG. 2 is replaced with the throttle opening degree TVO.

Figure 4:
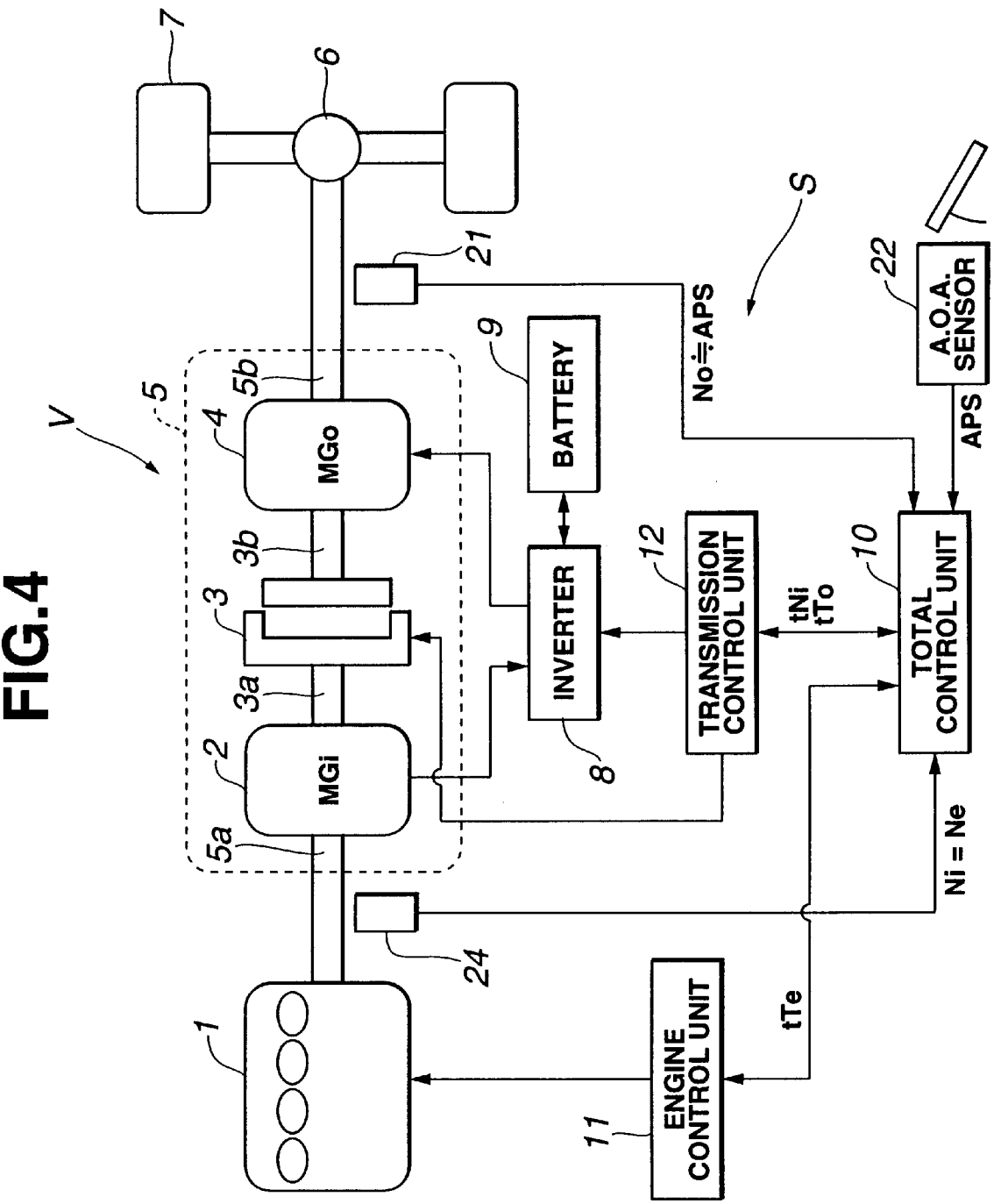
FIG. 4 is a diagrammatic illustration of a second embodiment of the driving force control system for a vehicle, according to the present invention.

FIG. 4 illustrates a second embodiment of the driving force control system according to the present invention, similar to the first embodiment. In this embodiment, the continuously variable transmission 5 includes the first motor-generator 2 and the second motor-generator 4. The clutch 3 is operatively interposed between the first and second motor-generators 2, 4. The first motor-generator 2 is directly connected through the input shaft 5a to the engine 1. The second motor-generator 4 is connected through the output shaft 5b and the differential 6 to the driven or road wheels 7.

At the input-side of the continuously variable transmission 5, the power output shaft (not identified) of the engine 1 is connected through the input shaft 5a (or the rotor shaft of the first motor-generator 2) to the input shaft 3a of the clutch 3. At the output-side of the continuously variable transmission 5, the output shaft 3b of the clutch 3 is connected through the output shaft 5b (or the rotor shaft of the second motor-generator 4) to the drive shaft of the vehicle V.

The first and second motor-generators 2, 4 are the same a.c. machines as those in the first embodiment, respectively, and connected through the inverter 8 to the battery 9.

In a state where the clutch 3 is released, the first motor-generator 2 serves as a generator while the second motor-generator 4 serves as a motor, so that the second motor-generator 4 is driven by electric power generated by the first motor-generator 2. At this time, the speed-changing ratio of the continuously variable transmission 5 is controlled by the first and second frequencies which are respectively supplied to the first and second motor-generators 2, 4. The first and second frequencies are controlled by the inverter 8. It will be understood that the speed-changing ratio of the continuously variable transmission is the ratio between the rotational speed of the first motor-generator 2 and the rotational speed of the second motor-generator 4. The battery 9 makes recovery of an excessive electric power in the continuously variable transmission 5 and makes its discharge to compensate shortage in power output of the engine 1.

In a state where the clutch 3 is engaged, the differential 6 is brought into a condition to be directly connected to the engine 1, so that the driven wheels 7 are driven in accordance with the power output of the engine 1. For example, when the input shaft rotational speed Ni and the output shaft rotational speed No of the continuously variable transmission 5 are equal to each other, the clutch 3 is engaged to cause a torque due to driving force of the engine 1 to be directly transmitted to the driven wheels 7, thereby suppressing loss of the motor-generators 2, 4 thus to improve a fuel consumption of the vehicle V.

The engine 1 is provided with an electronically controlled throttle device having a throttle valve similarly to that of the first embodiment, though not shown. The throttle valve is controlled in accordance with the driver's accelerator pedal depression amount APS by the engine control unit 11 which will be discussed after. The depression amount APS is detected by the accelerator operational amount sensor 22. Thus, the engine 1 realizes the target output shaft torque nTo in accordance with requirements or commands of the total control unit 10.

Here, the engine and transmission control units 11, 12 are adapted to calculate the target output shaft torque tTo (a first target driving torque) in accordance with the vehicle operating conditions of the vehicle V, and to send the target engine torque tTe as a command to the engine control unit 11 and the target input shaft rotational speed tNi as a command to the transmission control unit 12.

The total control unit 10 is adapted to read the output shaft rotational speed No of the transmission detected by the vehicle speed sensor 21, the input shaft rotational speed Ni of the transmission detected by the input shaft rotational speed sensor 24, and the accelerator pedal depression amount APS detected by the accelerator operational amount sensor 22, and then calculate the target output shaft torque tTo in accordance with the informations No, Ni, APS representative of the vehicle operating condition, as discussed below. The vehicle speed VSP of the vehicle V is obtained by multiplying the output shaft rotational speed No by a speed reduction ratio of the differential (or final reduction gear), a radius of the driven or road wheel, and/or the like.

The engine control unit 11 is adapted to carry out driving of the electronically controlled throttle device (not shown), a fuel injection control and a spark ignition timing control in accordance with the target engine torque tTe from the total control unit 10, thereby realizing generation of engine torque at the target engine torque tTe.

The transmission control unit 12 is adapted to control the first motor-generator 2 to take the target input shaft rotational speed Ni through the inverter 8, and to control the second motor-generator 4 to take the target output shaft torque tTo through the inverter 8.

Figure 5:
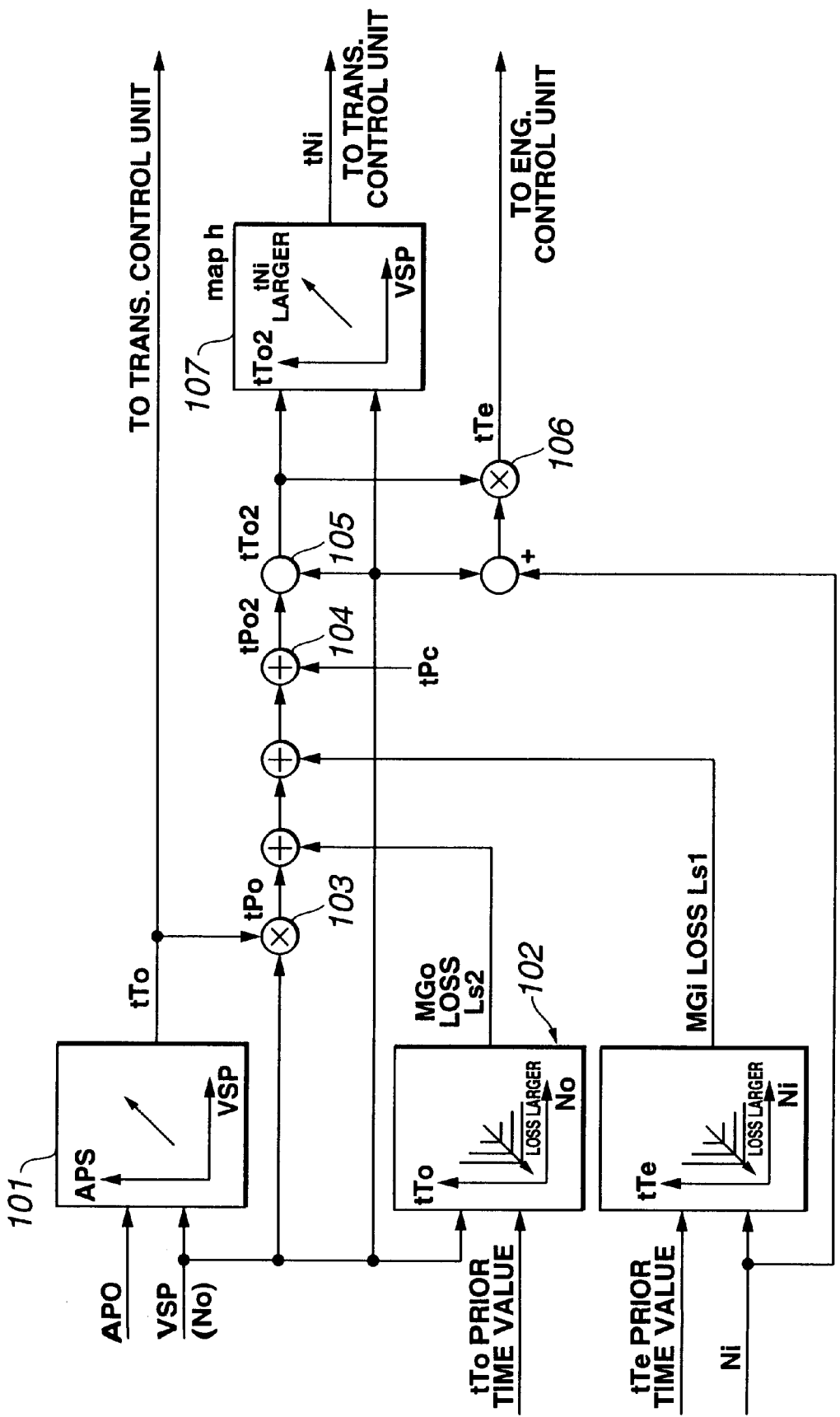
FIG. 5 is a diagram of principle of a control in a total control unit forming part of the driving force control system of FIG. 4.

As shown in FIG. 5, the total control unit 10 is arranged as follows: A target output shaft torque calculating section 101 calculates the target output shaft torque tTo in accordance with the vehicle speed VSP and the accelerator pedal depression amount APS. A loss calculating section 102 calculates a loss power Ls1 of the first motor-generator 2 and a loss power of the second motor-generator 4. A first target power output calculating section 103 calculates the target output shaft power output tPo by multiplying the target output shaft torque tTo by the vehicle speed VSP. A second target power output calculating section 104 calculates a second output shaft power output tPo2 by adding the loss powers Ls1, Ls2, a target charging amount tPc according to the charging requirement of the battery 9, and the like to the first target output shaft power output tPo. A second target output shaft torque calculating section 105 calculates a second target output shaft torque tTo2 (a second target driving torque) by dividing the second target output shaft power output tPo2 by the vehicle speed VSP. A target engine torque calculating section 106 calculates a target engine torque tTe by dividing the second target output shaft torque tTo2 by the speed-changing ratio of the continuously variable transmission 5. Additionally, a target input shaft rotational speed calculating section 107 calculates a target input shaft rotational speed tNi in accordance with the second target output shaft torque tTo2 and the vehicle speed VSP, for example, by using a map h.

The target output shaft torque tTo and the target input shaft rotational speed tNi are sent as commands to the transmission control unit 12. Then, the input shaft rotational speed Ni follows the target input shaft rotational speed tNi under a feedback control for the first motor-generator 2, while the second motor-generator 4 is driven to make a control toward the target output shaft torque tTo under a feedforward control for the second motor-generator 4. Additionally, the engine control unit 11 accomplishes the driving of the electronically controlled throttle device, the fuel injection control, and the like in accordance with the target engine torque tTe, thereby regulating torque generated by the engine 1.

Figure 6:
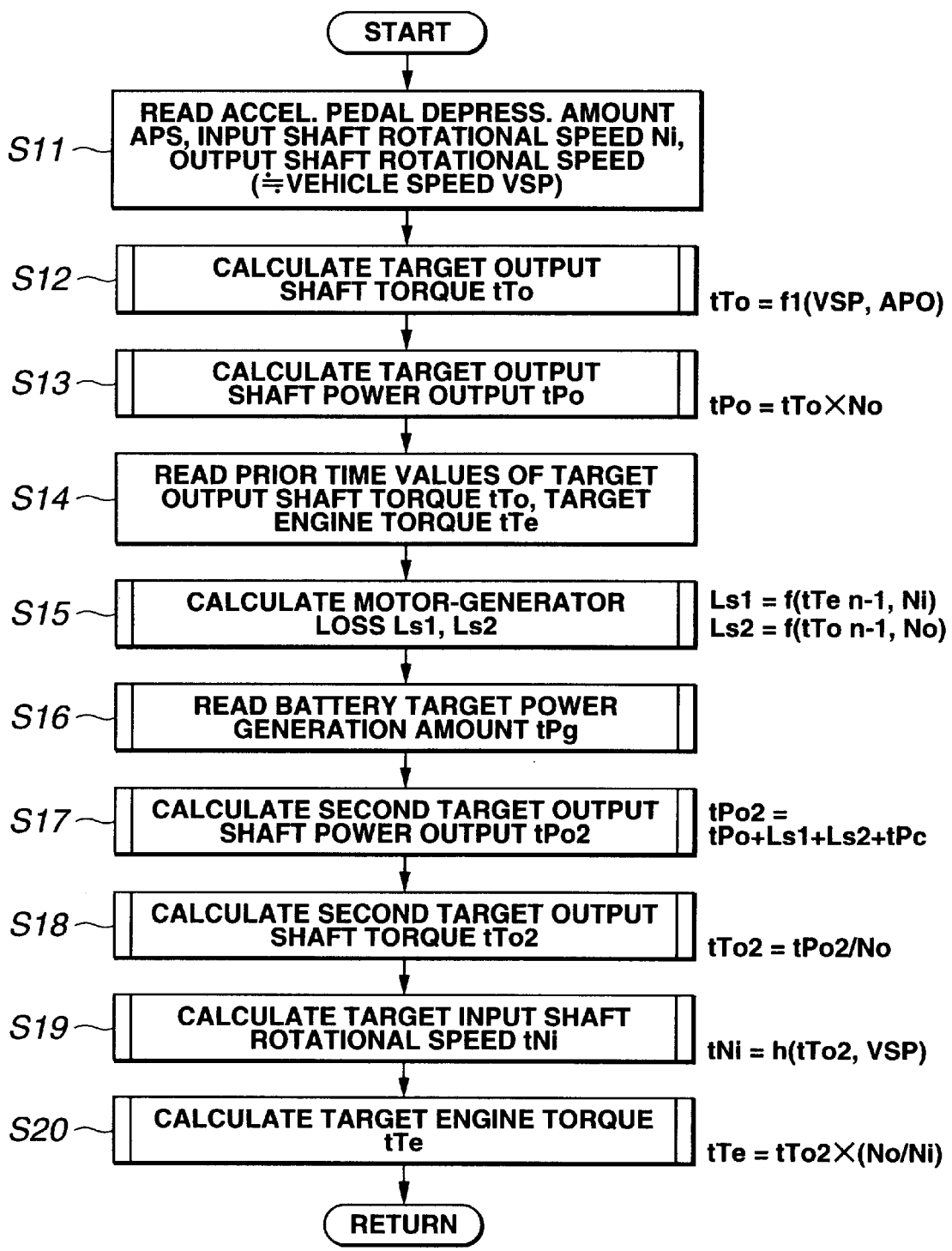
FIG. 6 is a flowchart of an example of a driving force control by the driving force control system of FIG. 4.

An example of the driving force control carried out by the total control unit 10 of the second embodiment will be discussed with reference to a flowchart shown in FIG. 6. The routine of the flowchart is executed every a certain time.

Figure 7:
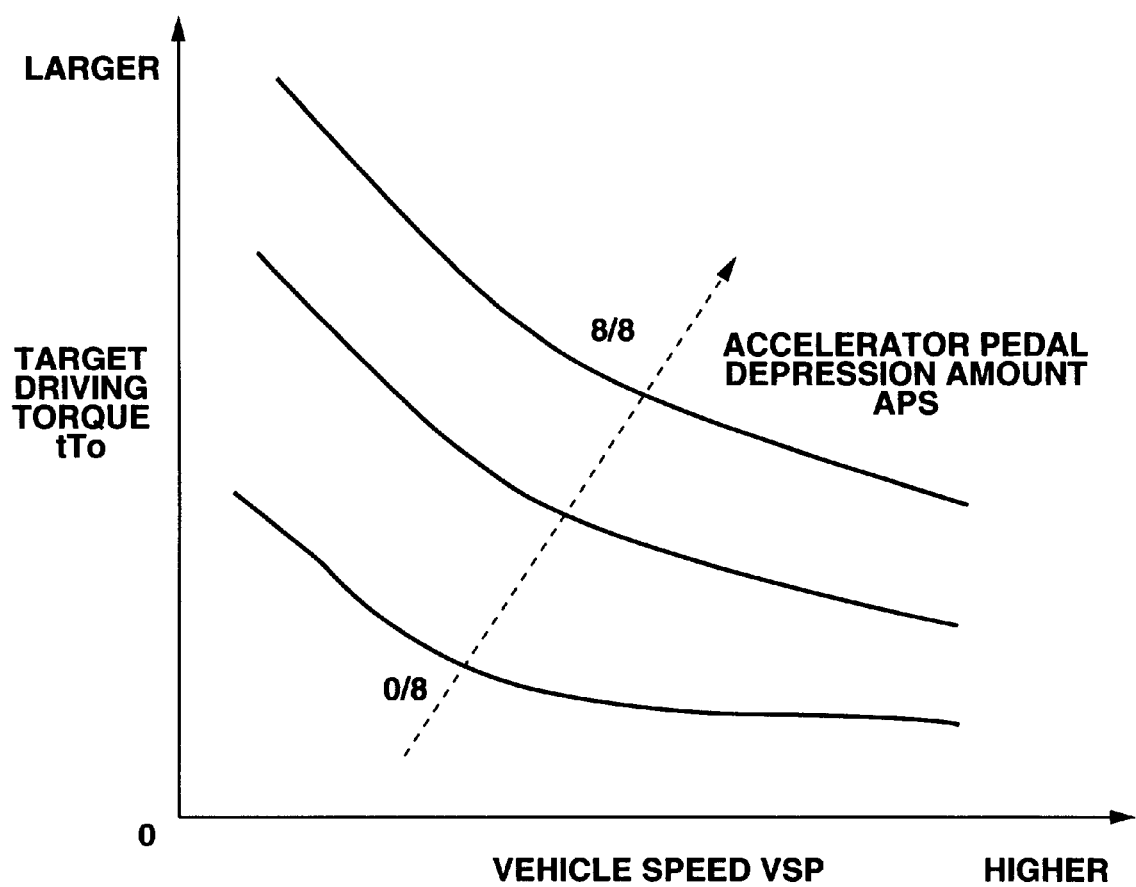
FIG. 7 is a map showing the relationship between a target driving torque tTo and a vehicle speed VSP ( an output shaft rotational speed No) with a parameter of an accelerator pedal depression amount APS, used in the driving force control shown in FIG. 6.

First, at a step S11, information such as the accelerator pedal depression amount APS, the input shaft rotational speed Ni, the output shaft rotational speed No ( the vehicle speed VSP), and the like are read from the various sensors shown in FIG. 4. At a step S12, the target output shaft torque tTo is calculated. Specifically, the target level output shaft torque tTo is calculated, for example, in accordance with the vehicle speed VSP and the accelerator pedal depression amount APS by using a previously set map shown in FIG. 7 in which the accelerator pedal depression amount APS is represented as 0/8 . . . 8/8.

At a step S13, the target output shaft power output tPo is calculated by multiplying the target output shaft torque tTo by the output shaft rotational speed No as follows:

tPo=tTo×No thus converting the torque into power output.

At a step S14, the target output shaft torque tTo and the target output shaft power output tPo at the prior (control) time such as the immediately preceding computer computation cycle are read. Then, a flow goes to a step S15 at which the loss power Ls1, Ls2 are calculated respectively by using previously set maps, as in the loss calculating section 102 shown in FIG. 5. The loss power Ls1 of the first motor generator 2 is determined in accordance with the current input shaft rotational speed Ni and a prior time value $tTe*z^{-1}$ of the target engine torque tTe. The loss power Ls2 is determined in accordance with the current output shaft rotational speed No and a prior time value $tTo*z^{-1}$ of the target output shaft torque tTo. Concerning torque, the value at the prior time is used in place of the current value, thereby lowering load in calculation.

At a step S16, the target charging amount tPc is read in accordance with the charging requirement of the battery 9. The target charging amount tPc represents a required value of power generation for the first motor-generator 2.

At a step S17, taking account of the efficiency of the motor-generators 2, 4 and charging of the battery 9, the second target output shaft power output tPo2 transmitted to the driven wheel 7 is calculated by adding the loss power Ls1 of the first motor-generator 2 and the loss power Ls2 of the second motor-generator 4 and the target power generation amount tTg to the target output shaft power output tPo obtained at the step S13, as follows:

tPo2=tPo+Ls1+Ls2+tPc

In other words, by converting the target output shaft torque tTo into the target output shaft power output tPo at the step S13, it is easily carried out to compare the loss amounts of the first and second motor generators 2, 4, the charged amount of the battery 9 and the like with the power output.

Subsequently, at a step S18, the second target output shaft torque tTo2 is calculated by dividing the second target output shaft power output tPo2 by the output shaft rotational speed No, as follows:

tTo2=tPo2/No in which the power output is again converted into the torque.

At a step S19, the target input shaft rotational speed tNi is calculated in accordance with the second target output shaft torque tTo2 and the vehicle speed VSP by using the previously set map h (or a function), as follows:

tNi=h(tTo2, VSP)

The map h corresponding to the target input shaft rotational speed calculating section 107 in FIG. 5 is so set as to cause the product of the efficiency ηe of the engine 1 and the efficiency ηmg1 to take the generally maximum value so as to realize the optimum fuel consumption. Additionally, the map h is so set that the target input shaft rotational speed tNi increases in accordance with an increasing value of the second target output shaft torque tTo2 as the vehicle speed VSP lowers.

Finally, at a step S20, the target engine torque tTe is calculated by dividing the second target output shaft torque tTo2 by the speed-changing ratio of the continuously variable transmission 5, in which tTe=tTo2(No/Ni).

By repeating execution of the routine of the above flowchart, the engine control unit 11 controls the power output of the engine in such a manner as to realize the target engine torque tTe determined at the step S20, while the transmission control unit 12 controls the first and second motor generators 2, 4 in accordance with the target output shaft torque tTo determined at the step S2 and the target input shaft rotational speed tNi determined at the step S19.

Here, at the step S18, the second target output shaft power output tPo2 is divided by the output shaft rotational speed No, so that the power is again converted into the torque. Accordingly, the relationship between the target input shaft rotational speed tNi and the vehicle speed VSP varies with the second target output shaft torque tTo2 serving as a parameter.

Thus, according to the above embodiment, the second motor-generator is driven by the electric power generated by the first motor-generator connected to the engine, thereby transmitting the power output of the engine to the driven or road wheels. Additionally, the speed-changing ratio of the transmission is changed by altering the ratio between the rotational speeds of the respective first and second motor-generators. The driving force control for such a transmission is carried out as follows: The driving torque of the second motor-generator is controlled in accordance with the first target driving torque. The target input shaft rotational speed (or the rotational speed of the first motor-generator) is set in accordance with the relationship between the second target driving torque and the vehicle speed, in which the second target driving torque is obtained by converting a power output value (obtained by converting the first target driving torque into a power output and corrected) again into a torque in accordance with the value representative of the vehicle speed (for example, the output shaft rotational speed). Accordingly, the relationship between the target input shaft rotational speed and the vehicle speed changes with a parameter of the second target driving torque by setting the target engine torque of the engine in accordance with the second target driving torque and the speed-changing ratio.

Accordingly, the target input shaft rotational speed tNi is different if the vehicle speed VSP is different even in case that the same level of power output is required. Particularly, by setting the map h for determining the target input shaft rotational speed tNi in such a manner that the target input shaft rotational speed tNi decreases as the vehicle speed VSP lowers, a setting is made such that the input shaft rotational speed Ni (=the engine speed Ne) increases with acceleration of the engine, for example, during an abrupt deceleration in which a required power output increases. This makes possible to cause driver's driving operation to become compatible with variation in the engine speed Ne, thereby improving driveability of the engine without providing a feeling of physical disorder to the driver. Additionally, by setting the map h in the above step S19, a variation in the engine speed Ne can be regulated in accordance with the vehicle speed VSP, so that setting can be made according to vehicle kinds and vehicle types thereby enlarging freedom in designing the vehicle.

Figure 8:
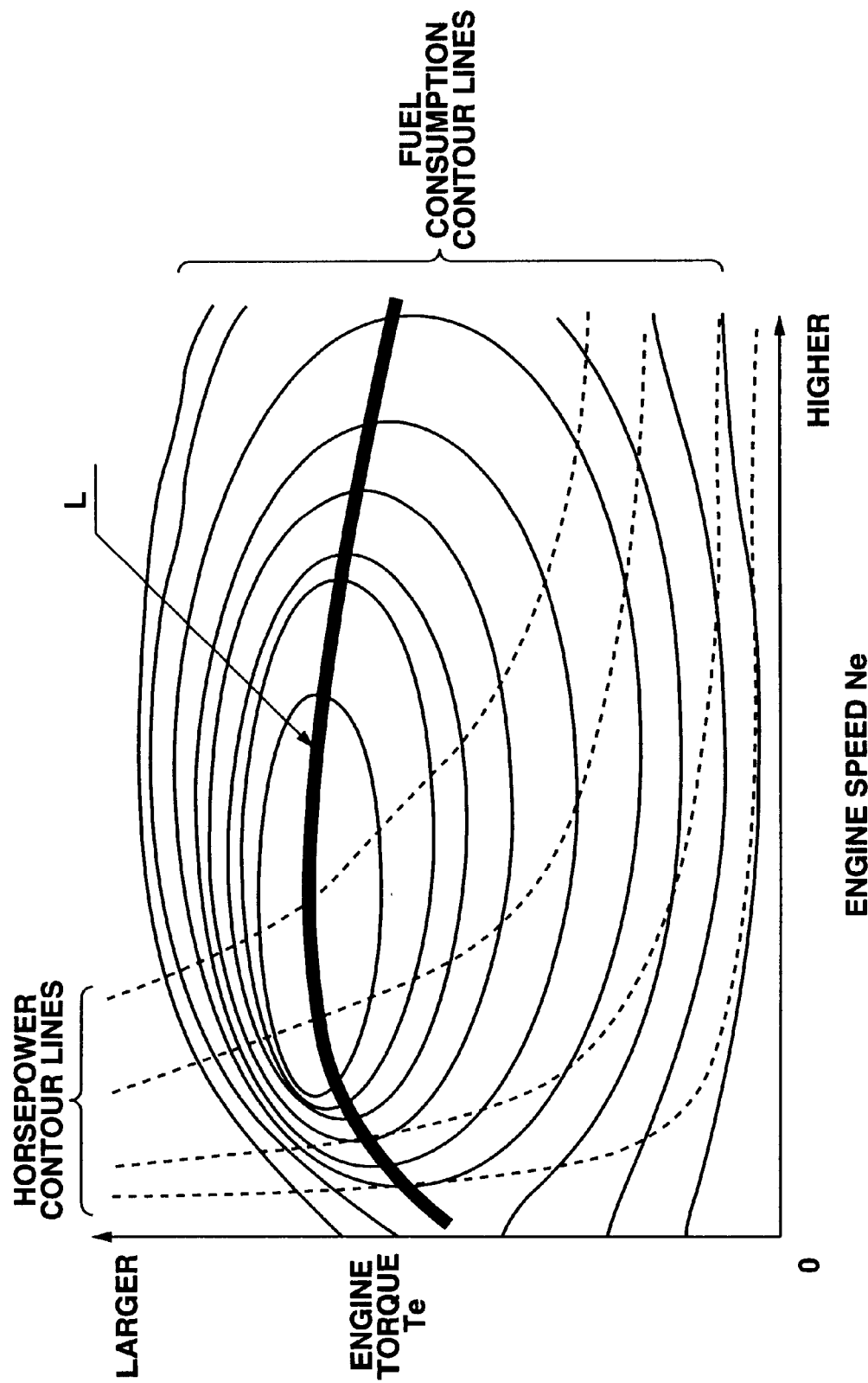
FIG. 8 is a map showing an optimum fuel consumption line L in the relationship between horsepower contour lines and fuel consumption contour lines, in terms of an engine torque Te and an engine speed Ne, used in the driving force control shown in FIG. 6.

While it is preferable that the above map h is so set that the product of the efficiency ηe of the engine 1 and the efficiency ηmg1 of the motor generator 2 to take the generally maximum value for achieving the optimum fuel consumption. However, the engine speed is univocally determined corresponding to the engine torque Te in case that the engine speed Ne or the input shaft rotational speed Ni is determined along an optimum fuel consumption line L along which the fuel consumption takes the best values, as shown in FIG. 8 in which the relationship between the engine speed Ne and the engine torque Te is represented as fuel consumption contour lines each of which is described by connecting points corresponding to the same fuel consumption. In FIG. 8, horse power contour lines are also described by connecting points corresponding to the same horsepower. Consequently, by setting the relationship between the engine torque Te and the engine speed Ne in the vicinity of the optimum fuel consumption line L in FIG. 8 so as to have a range in the relationship, a sufficient fuel consumption performance can be obtained even upon varying the engine speed Ne in accordance with a change in the vehicle speed VSP.

While the first and second motor generators have been shown and described as constituting the continuously variable transmission 5 in the above embodiments, it will be understood that the vehicle V may be used as a hybrid drive vehicle by driving the vehicle only under drive of the second motor-generator 4 when the clutch 3 is released, and by starting the engine 1 under drive of the first motor-generator 2.

Although the first and second motor-generators have been shown and described as being disposed opposite to each other in the above embodiments, it will be appreciated that they may be replaced with such a rotary electric motor that two rotors are coaxially disposed as disclosed in Japanese Patent Application No. 10-77508.

The entire contents of Japanese Patent Applications P10357783 (filed Dec. 16, 1998) and P11-172426 (filed Jun. 18, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A driving force control system for a vehicle, comprising:
   a transmission including a first motor-generator connected to an engine, and a second motor-generator connected to driven wheels and driven by electric power generated by said first motor-generator;
   a first rotational speed sensor for detecting a rotational speed of said first motor-generator;
   a second rotational speed sensor for detecting a rotational speed of said second motor-generator;
   a control unit programmed to control the rotational speed of said first motor-generator in accordance with the rotational speed of said second motor-generator, said control unit being programmed to control a ratio between a first driving frequency for said first motor-generator and a second driving frequency for said second motor-generator so as to control the rotational speeds of said first and second motor-generators.

2. A driving force control system as claimed in claim 1, wherein said control unit is programmed to control a torque of said second motor-generator in accordance with an electric power generated by said first motor-generator, and the rotational speed of said first motor-generator is controlled in accordance with the rotational speed of said second motor generator.

3. A driving force control system as claimed in claim 2, wherein said control unit is programmed to detect a depression amount of an accelerator pedal, and to calculate a power output to be generated by the engine, in accordance with the rotational speed of said first motor generator.

4. A driving force control system as claimed in claim 3, wherein said control unit is programmed to correct the torque of said second motor-generator in accordance with efficiencies of said first and second motor-generators.

5. A driving force control system as claimed in claim 4, wherein said first and second motor-generators are connected to a battery so that the battery is charged, wherein said control unit is programmed to correct the torque of said second motor-generator in accordance with a charged amount of said battery.

6. A driving force control system as claimed in claim 1, wherein said transmission includes a clutch through which said first and second motor-generators are connectable.

7. A driving force control system as claimed in claim 6, wherein said clutch is engageable to connect said first and second motor-generators under a condition where the input shaft rotational speed and the output shaft rotational speed of said transmission are equal to each other.

8. A driving force control system for a vehicle, comprising:
   a transmission including a first motor-generator connected to an engine, and a second motor-generator connected to driven wheels and driven by electric power generated by said first motor-generator;
   a first rotational speed sensor for detecting a rotational speed of said first motor-generator;
   a second rotational speed sensor for detecting a rotational speed of said second motor-generator; and
   means for controlling the rotational speed of said first motor-generator in accordance with the rotational speed of said second motor-generator, said controlling means including means for controlling a ratio between a first driving frequency for said first motor-generator and a second driving frequency for said second motor-generator so as to control the rotational speeds of said first and second motor-generators.

9. A driving force control system for a vehicle, comprising:
   a transmission including a first motor-generator connected to an engine, and a second motor-generator connected to driven wheels; and
   a control unit programmed to carry out
   calculating a first target driving torque in accordance with at least one of an operating condition of the vehicle and a driver's operation for the vehicle,
   calculating a target power output in accordance with the first target driving torque and a value representative of a vehicle speed,
   correcting the target power output in accordance with an operating condition of said transmission and the state of charge of a battery,
   setting a second target driving torque upon calculating the second target driving torque in accordance with the corrected target power output and the value representative of the vehicle speed,
   setting a target input shaft rotational speed of said transmission upon calculating the target input shaft rotational speed in accordance with the second target driving torque and the value representative of the vehicle speed,
   setting a target engine torque upon calculating the target engine torque in accordance with a speed-changing ratio set for said transmission and the second target driving torque, the target engine torque, and
   controlling said first motor-generator in accordance with the target input shaft rotational speed, and controlling said second motor-generator in accordance with the first target driving torque.

10. A driving force control system as claimed in claim 9, wherein said transmission includes a clutch through which said first and second motor-generators are connectable.

11. A driving force control system as claimed in claim 10, wherein said clutch is engageable to connect said first and second motor-generators under a condition where the input shaft rotational speed and the output shaft rotational speed of said transmission are equal to each other.

12. A driving force control system as claimed in claim 9, wherein said control unit is programmed to carry out the calculating the target power output by multiplying the first target driving torque by an output shaft rotational speed of said transmission.

13. A driving force control system as claimed in claim 9, wherein said control circuit is programmed to carry out the correcting by adding at least losses of said first and second motor-generators to the target power output.

14. A driving force control system as claimed in claim 9, wherein said control circuit is programmed to carry out the setting the second target driving torque upon calculating the second target driving torque by dividing the corrected target power output by the output shaft rotational speed of said transmission.

15. A driving force control system as claimed in claim 9, wherein the value representative of the vehicle speed is one of a vehicle speed and a value corresponding to the vehicle speed.

16. A driving force control system for a vehicle, comprising:
    a transmission including a first motor-generator connected to an engine, and a second motor-generator connected to driven wheels;
    means for calculating a first target driving torque in accordance with at least one of an operating condition of the vehicle and a driver's operation for the vehicle;
    means for calculating a target power output in accordance with the first target driving torque and a value representative of a vehicle speed;
    means for correcting the target power output in accordance with an operating condition of said transmission;
    means for setting a second target driving torque upon calculating the second target driving torque in accordance with the corrected target power output and the value representative of the vehicle speed;
    means for setting a target input shaft rotational speed of said transmission upon calculating the target input shaft rotational speed in accordance with the second target driving torque and the value representative of the vehicle speed;
    means for setting a target engine torque upon calculating the target engine torque in accordance with a speed-changing ratio set for said transmission and the second target driving torque;
    means for controlling the engine in accordance with the target engine torque; and
    means for controlling said first motor-generator in accordance with the target input shaft rotational speed, and controlling said second motor-generator in accordance with the first target driving torque.

17. A method of controlling driving force for a vehicle provided with a transmission including a first motor-generator connected to an engine, and a second motor-generator connected to driven wheels and driven by electric power generated by said first motor-generator, a first rotational speed sensor for detecting a rotational speed of said first motor-generator, and a second rotational speed sensor for detecting a rotational speed of said second motor-generator, said driving force controlling method comprising:
    controlling the rotational speed of said first motor-generator in accordance with the rotational speed of said second motor-generator; and
    controlling a ratio between a first driving frequency for said first motor-generator and a second driving frequency for said second motor-generator so as to control the rotational speeds of said first and second motor-generators.

18. A method of controlling driving force for a vehicle provided with a transmission including a first motor-generator connected to an engine, and a second motor-generator connected to driven wheels, said driving force controlling method comprising:
    calculating a first target driving torque in accordance with at least one of an operating condition of the vehicle and a driver's operation for the vehicle;
    calculating a target power output in accordance with the first target driving torque and a value representative of a vehicle speed;
    correcting the target power output in accordance with an operating condition of said transmission;
    setting a second target driving torque upon calculating the second target driving torque in accordance with the corrected target power output and the value representative of the vehicle speed;
    setting a target input shaft rotational speed of said transmission upon calculating the target input shaft rotational speed in accordance with the second target driving torque and the value representative of the vehicle speed;
    setting a target engine torque upon calculating the target engine torque in accordance with a speed-changing ratio set for said transmission and the second target driving torque;
    controlling the engine in accordance with the target engine torque; and
    controlling said first motor-generator in accordance with the target input shaft rotational speed, and controlling said second motor-generator in accordance with the first target driving torque.

* * * * *